Dec. 6, 1960  H. JUNG  2,963,158
FILTER
Filed Sept. 11, 1956  5 Sheets-Sheet 1

INVENTOR
Hans Jung

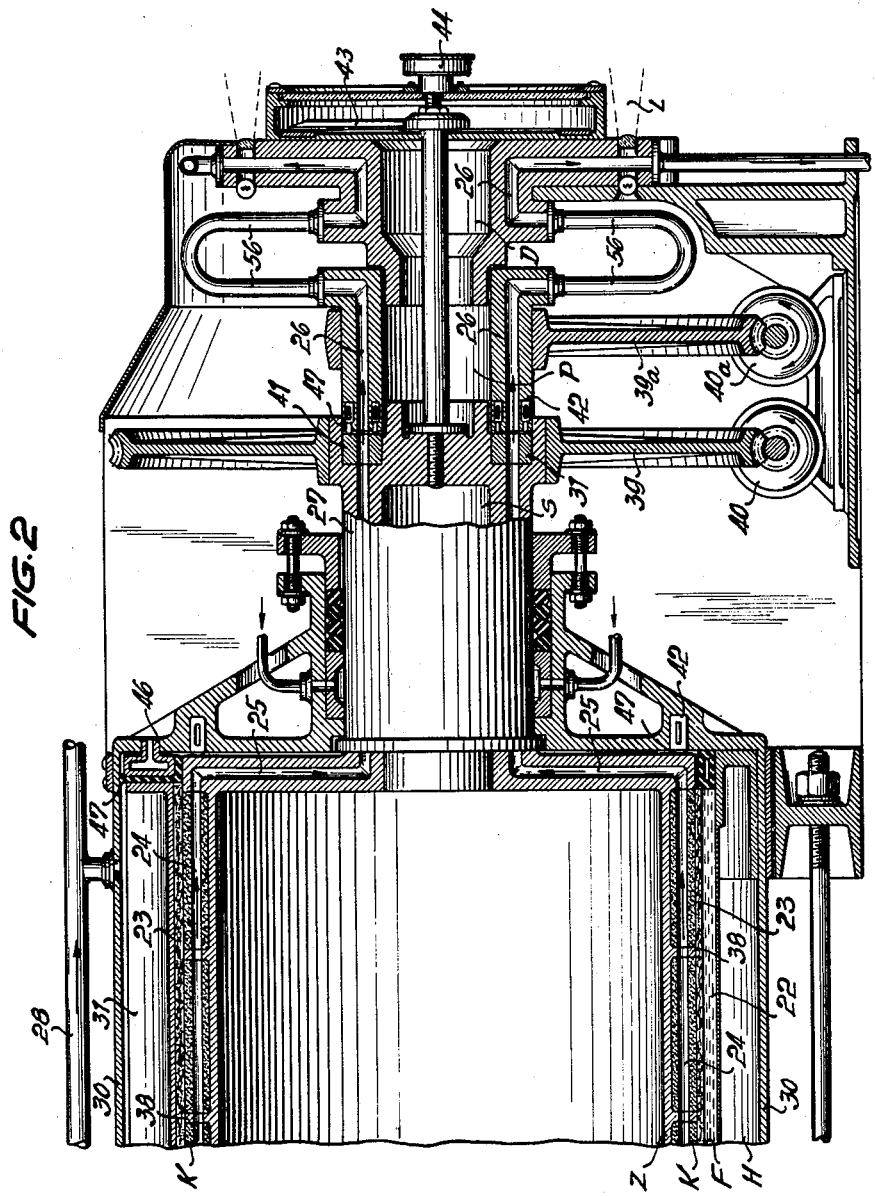

Dec. 6, 1960 H. JUNG 2,963,158
FILTER
Filed Sept. 11, 1956 5 Sheets-Sheet 3
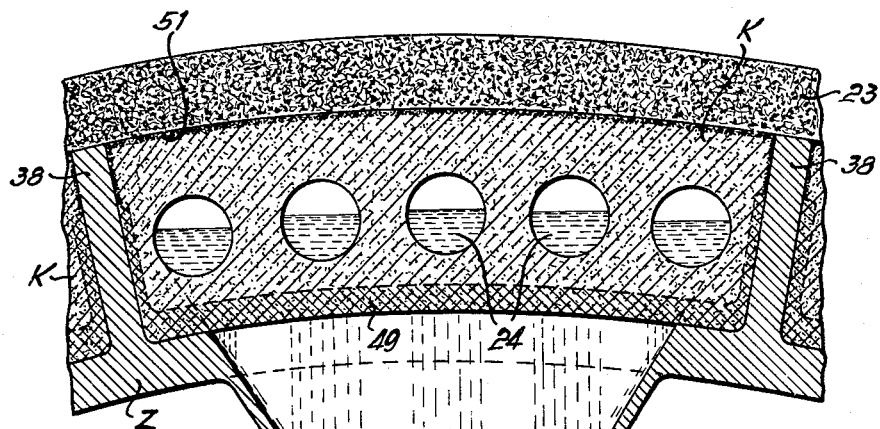
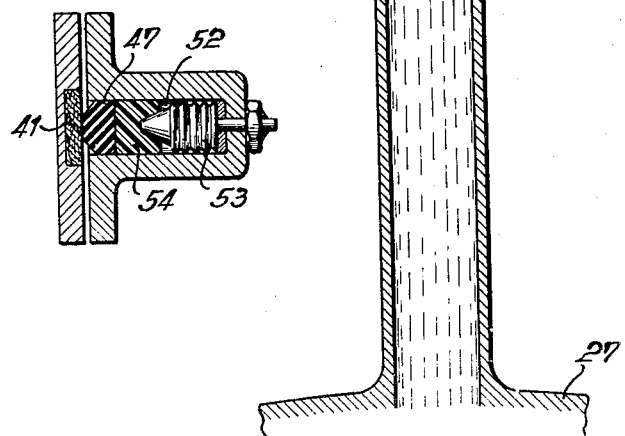
INVENTOR
Hans Jung
By
Patent Agent Dec. 6, 1960 H. JUNG 2,963,158
FILTER
Filed Sept. 11, 1956 5 Sheets-Sheet 4
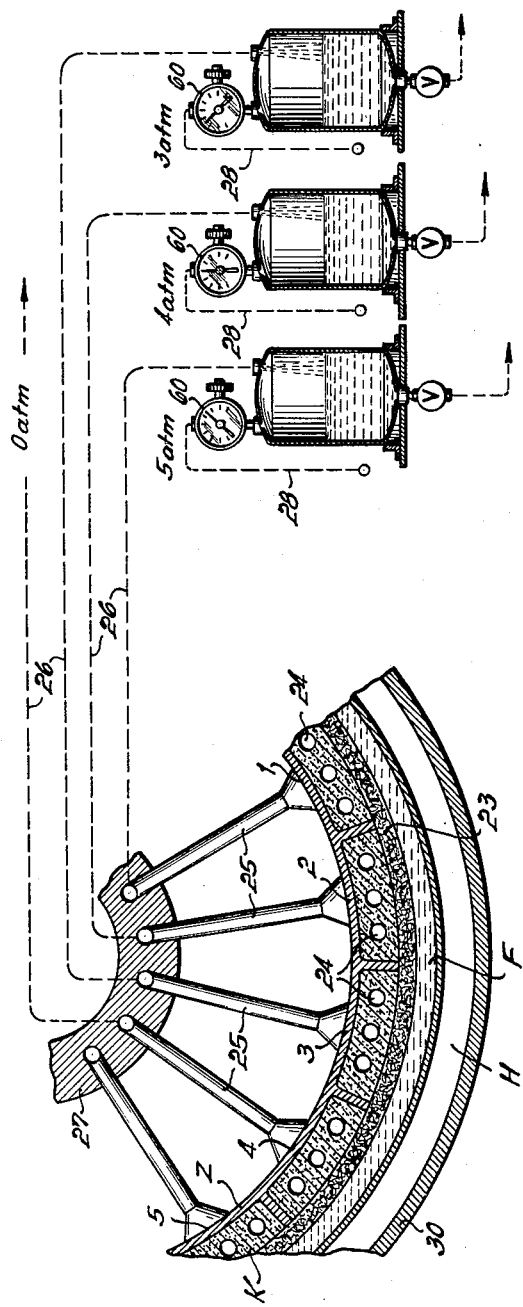
INVENTOR
Hans Jung
By
Patent Agent Dec. 6, 1960  H. JUNG  2,963,158
FILTER
Filed Sept. 11, 1956  5 Sheets-Sheet 5

INVENTOR:
Hans Jung
By
Patent Agent

United States Patent Office 2,963,158
Patented Dec. 6, 1960

2,963,158

FILTER

Hans Jung, Rosterstrasse 71, Siegen, Westphalia, Germany

Filed Sept. 11, 1956, Ser. No. 609,323

Claims priority, application Germany Sept. 12, 1955

29 Claims. (Cl. 210—86)

The present invention relates to a device such as a filter for separating a pulp into a clear filtrate and into a dehumidified residue. Filters of various designs are known for industrial employment. For various reasons, the so-called rotary filters are preferred which work as immersion-pressure filters.

It is an object of the present invention so to improve filters of this type that the heretofore unavoidable drawbacks will be obviated.

It is also an object of this invention to provide a filter automat of the type of a pressure filter with high filtering power, which will work in an uninterrupted manner.

These and other objects and advantages of the invention will appear more clearly from the following specification in connection with the accompanying drawings, in which:

Fig. 2 shows a longitudinal section through the pressure filter, said section being taken through the control head.

Fig. 3 illustrates in cross section and on a larger scale a filtering cell made of ceramic material or the like.

Fig. 4 is a longitudinal section through a seal by means of a metal bellows for walls to be sealed.

Fig. 5 illustrates an embodiment in which each filtering cell is adapted to work under a pressure different from the pressure in the general pressure chamber.

Fig. 6 illustrates the installation of adjustable reducing valves in the discharge conduits.

Figure 1:
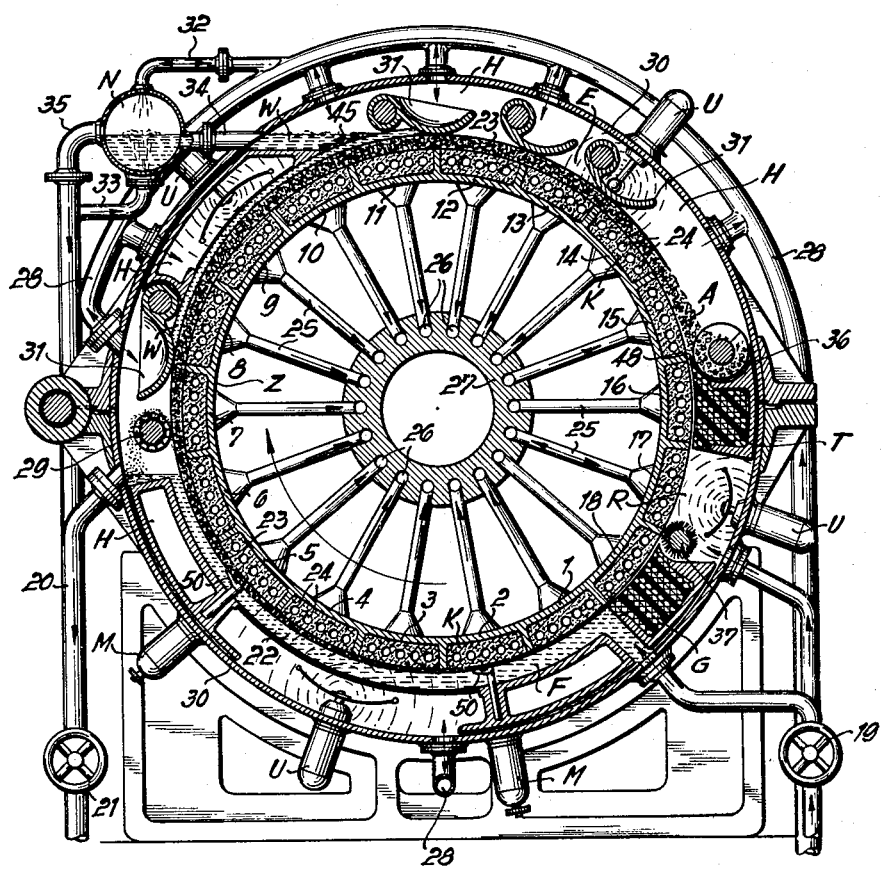
Fig. 1 illustrates a cross section through a pressure filter, said section being taken close to the front end face near the control head side.

According to the invention, a heretofore unobtainable and nearly complete regeneration of the filter body is obtained in addition to a considerably increased filtration with automatic control of the residue formation and a further treatment at a high efficiency.

The heretofore known filter bodies of rigid porous masses such as ceramic material, quartz, porcelain, glass or carbon are, as far as their chemical indifference is concerned, superior to all heretofore known filters consisting of synthetic or other materials. However, heretofore, the general employment of such filter bodies in the industry was not possible due to the rather difficult regeneration of the filter bodies. Due to the regeneration of the filter bodies in conformity with the present invention it has now become possible in industry generally to employ filter bodies of rigid ceramic or porous metallic acid resistant material. With the heretofore known pressure filters and vacuum filters it has been possible to regenerate the filter surfaces and the filter pores up to a maximum of 60%. According to the present invention, an automatic regeneration of the filter pores and filter surfaces up to 90% will be possible. This is particularly important with heavy encrusting products, for instance in the aluminum industry, in connection with zinc electrolysis, in dye factories, in the sugar industry, etc.

In the filtering technique it has heretofore not been possible, from the outside to control the working operations in a hermetically closed filtering machine which works under pressure, so that it was not possible to adapt all operations to the desired properties of the respective product, which means quickly to regulate the machine. In conformity with the present invention, all operations in the pressure chamber are measured instantly and are, if desired, registered on the outside or visually indicated. Due to a continuous and automatic measurement of the residue quantity, the time period of the entire working charge is measured instantly and registered on the outside or, if desired, is adjusted automatically in conformity with the most favorable degree of efficiency depending on the properties of the respective product. Furthermore, by means of automatically working liquid density meters, the most favorable degree of washing out the residue in the filter pressure chamber is measured and, if desired, is automatically controlled and maintained in conformity with the most favorable degree of efficiency for the washing out of the residue. Additionally, by means of compressed air-fluid flow meters, the dehumidification of the residue in the pressure chamber is measured on the outside of the device so that the possibility is furnished at the outside to increase the residue dehumidification degree in a desired manner.

The pressure filter according to the present invention belongs to the type of immersion filters and consists primarily of a horizontally working porous cylinder. This cylinder is enclosed in the pressure atmosphere of a gas, mostly air under pressure. In this atmosphere which is separated from the outside air, all treatments of the pulp, the residue and the filter surface are successively effected over the entire length of the circumference of the rotating cylinder. All stations may, in conformity with the invention, be provided with novel effective devices which will work in an uninterrupted manner and, if desired, automatically.

Referring now to the drawings in detail, the filter cylinder Z rotates either continuously or periodically during operation. The surface of the cylinder Z is subdivided into segments or cells, for instance into cells 1 to 18. The circumference above the filter cylinder Z is sub-divided in conformity with the desired working phases, for instance into seven cells 1–7 for the filtration, into further four cells 8 to 11 for the washing out of the residue, into further three cells 12 to 14 for the dehumidification of the residue and into the successive cell 15 for the discharge of the treated and denumidified residue 23. The width of the next cell 16 serves as partition between the dehumidified solid residue 23 and the regenerating chamber R for the filter body. The regeneration of the filtering surface and of the filter pores is effected in the chamber R. The width of the further cell 18 forms the partition G which extends from the regenerating chamber R to the filtration chamber F. Fig. 1 illustrates for the just described working phases the distances F', W, E, A, T, R and G at the instant when all working means of each cell in all distances or operation are switched over.

Pulp 22 enters into the adjustable pressure filter at the lower side thereof through a valve 19 and by way of one or more tubes passes into the approximately semi-circular filtering chamber F of the cell 1. It then flows through the filter chamber F at low depth up to the cell 7. Here the excess of the pulp 22 is continuously discharged through the overflow pipes 20 with the adjustable valve 21 and flows in a circuit back to an agitator for the pulp (not shown in the drawing). The filtration and all other working phases are carried out in a pressure chamber H. The working phases are carried out by means of air under pressure or another inert gas under pressure so that the total pressure chamber H will be under pressure, for instance under a pressure of six atmospheres above atmospheric pressure. The filtration chamber F comprises the cells 1 to 7. Preferably in the center of this filtration chamber F, and acting against the pulp 22 and the residue 23 there is arranged an ultra sound generator U which is operated electromagnetically or by air under pressure. The pressure filtration may in this way be aided in the chamber F by ultra sound. The ultra sound, when at an appropriate frequency, e.g. 15,000–20,000 Hertz cycles per second, brings about a degasification of the pulp. When filtering under pressure, the ultra sound retards the gas absorption in the pulp 22. At the same time, the ultra sound at appropriate frequency and depending on the structure of the solid particles, brings about a formation of a less solid residue cake 23 along the porous contacting surface than is the case when working without ultra sound at a frequency in conformity with the structure of the solid particles and at the same filtering pressure. This effect results in an increase in the flow of the filtrate through the pores of the residue, i.e. brings about an increased filter output which is particularly important when dealing with solid particles of fine structure.

The filtrate passes through the pores of the filter body K. The filter bodies K have the shape of segmental cells and consist, for instance, of ceramic material. The filtrate then enters into the passages 24 extending axially with regard to the cylinder Z, and thereupon passes at the end face of the control head S (see Fig. 2) into the radially arranged collector pipes 25 and from there is conveyed through the passages 26 in shaft 27 of the control head S toward the outside. The chamber into which the ultra sound generator U extends and all hollow chambers of the pressure filter in which working elements are provided communicate with the feeding and equalizing conduit 28 for the air under pressure. Thus, throughout the entire filter a pressure equilibrium prevails, even when air under pressure flows into the individual working chambers in a continuous or periodic manner (discharge of residue) or is discharged therefrom (dehumidification). It is advantageous in addition to the pressure filter, to connect to the artificial pressure atmosphere individual or a plurality of containers for the operating means pertaining to the filter operation because in the pressure filter, most operating means carry out a closed circuit.

With the adjustable slow rotation of the filter cylinder Z, the residue begins slowly to increase on the filter cell 1 in conformity with the structure of the solid particles and, finally, at the level of the filter cells 6 and 7, obtains the desired maximum thickness, preferably up to 40 millimeters with this type of immersion so that a proper washing out and treatment of the residue will be assured.

Shortly prior to the emersion from the pulp 22 with increased residue 23, each filter cell has to pass a miller 29. Here the residue 23, which still moves in the pulp 22, is equalized so that the surface of the residue 23 will be as uniform as possible for the successive treatments such as washing out operation and dehumidification. Closely below the residue miller, there is provided a plurality of overflow pipes or conduits 20 which are arranged along the wall of the pressure cylinder 30 and communicate with each other.

The spacing in the pulp for the formation of the residue cake 23 is very low. The pulp 22 is in a condition of continuous flow in the direction toward the overflow openings 20. This path of the flow is under the influence of sound of appropriate frequency for instance of ultra sound frequency. If, for particular reasons, the space in the pulp 22 is selected greater and if in view of coarser solid particles no ultra sound effect is resorted to, one or more movable members for the pulp 22 is arranged in a manner known per se so that the pulp cannot de-mix itself. The clear filtrate which is deposited due to the separation brought about by the filtering process passes through the pores of the residue 23 and through the pores of the filter body K. From here the filtrate passes into the porous channels 24 and then through the radial channels 25 into the passages 26 in shaft 27 and finally is discharged toward the outside through the control head from where it passes through the filtrate container for further processing.

*Washing out of the filter residue*

After effected pressure filtration, each filter cell successively moves into the chamber W for washing out the residue with water or another liquid. This chamber W extends from the cell 8 to the cell 11 inclusive. This entire chamber W is connected through conduit 28 to the general pressure chamber H. For a residue washing distance from approximately two to three cells, additionally and advantageously a sound generator U may be employed for a purpose similar to that described in connection with the pressure filtration. A very effective washing out of the residue 23 is obtained when the entire solid particle surface is completely covered and remains covered by a layer of liquid. Technically most favorable is a layer of a thickness of about from 10 to 20 millimeters. The complete and permanent covering of the residue 23 with a liquid brings about an effective and quick washing out under pressure and ultra sound and a small quantity of salt-free water so that, in contrast to the situation heretofore encountered with immersion filters, no large quantities of excessive washing out liquid can enrich themselves with salt and residue solid particles from the pulp 22. The essential point of this washing out operation, therefore, consists in that the always salt-free washing out liquid is completely used up through the pores of the residue 23 while it passes around the solid particles. The salt-free liquid continuously covers at the same thickness the entire residue 23 in the pressure chamber H and is, if desired, under the influence of ultra sound. The washing out liquid returns in a closed circuit to the liquid container but does not contact the residue 23 during its return flow.

The pulp and the washing liquid may also be circulated in such a manner that the returning excessive liquid enters a condenser-like chamber and, while being automatically controlled by a float, passes into the atmosphere and back into the charging container.

To allow the pulp 22 to circulate in a closed circuit brings about the advantage that the pulp liquid remains homogeneous and that the portion of the residue 23 milled by the residue miller 29 is discharged back to the charging container, and, if desired, further maintains the temperature of the pulp 22 constant.

When a float arrangement is provided, the charging containers do not have to communicate with the general pressure chamber H. Special floats will then maintain the level constant by controlling the discharge at 20 and, if desired, also by indirect control of the admission at 19 (not shown). In the washing-out chamber W there will prevail the generally adjusted pressure atmosphere of the pressure chamber H plus the pressure of the washing liquid column of about 0.07 atmosphere above atmospheric pressure. This last mentioned pressure is maintained and sealed by the smooth resilient and semi-circular sealing elements 31 so that no washing liquid can enter into the adjacent working chambers. The sealing of the washing chamber W for each thickness of the residue 23 at the resilient sealing elements 31 is effected pneumatically or hydraulically at a low super pressure against the general pressure in the pressure chamber H. The surface sealing 46 (Fig. 2) arranged at the end face of the pressure mantle 30 and increasing pneumatically or hydraulically, is provided with an additional sliding surface 47 which, for instance, is pressed in a belt-like manner from graphite-asbestos-lead fibers and is interconnected by rubber or the like. Thus, the seal 31 of the chamber W automatically adapts itself also to a residue thickness less than the originally adjusted one.

The washing-out liquid is passed through a circulating pump into a cylinder N which will hold the level. This cylinder is through conduit 32 under the general pressure of the pressure chamber H. The washing liquid enters at 33 into the cylinder N and maintains the level through pipe 34, while the excess liquid flows back through pipe 35 into the washing liquid charging container. Any flow caused by the washing liquid entering into the washing chamber W and harmful to the residue cake in a mechanical sense is first broken or split up by a screen surface 45 and is then passed to the surface of the residue.

As mentioned above, a float in the cylinder N may keep the liquid level in the cylinder N constant. Instead of a float, the washing liquid level may also be held constant by means of a volume meter of any standard type or for instance also by means of a standard thermo-sensing device (residue meter indirectly controlled by a relay).

The chamber W for the washing-out operation extends from the cell 8 up to cell 11 inclusive. The washing liquid, due to the general pressure and, if desired, aided by ultra sound penetrates the pores of the loosened residue, pushes forward the clear and still concentrated salt solution in the residue and washes around each solid particle until the desired dilution of the salt solution has been obtained at the discharging washing filtrate. Said dilution is measured aerometrically. The washing filtrate continuously enters the porous seals in the washing chamber, passes horizontally through the channels 24, then flows through the pipes 25 radially arranged at the end face of the control head and passes through the discharge channels 26 through the control head S, P and D toward the outside while it may be controlled and regulated in an appropriated manner. The washing out of the residue on the heretofore known drum filters is carried out mostly by means of atomizing nozzles. This atomizing is, however, rather incomplete and the result is unsatisfactory. A good and quick washing out and adaptation to the chemically and physically differing residues is one of the most difficult processes in the filtering technique. The washing-out system according to the present invention makes it possible to carry out all types of wetting and humidification methods for filter residues and does so in a limited washing chamber W.

Dehumidification of the residue

Subsequent to the washing out of the residue 23, a dehumidification of the residue cake is effected up to the desired degree of humidity. The space for the treatment of the residue 23 with air under pressure or gas under pressure extends from the cell 12 to the cell 14. The obtainable degree of humidity is dependent on the structure of the solid particles. With the filtering machine according to the invention, it is possible greatly to increase the degree of dehumidification because there exists the possibility of treating the residue 23 in a tear-free manner which means that there will be no tears in the residue. This is done by means of air under pressure cold or warm with sound of appropriate frequency and, if desired, with steam and simultaneously by means of mechanical pressure. The purpose of the mechanical pressure consists in preventing the formation of a shrinkage in the residue cake which usually occurs in form of mosaic-like tears during the dehumidification of the residue. This pressure brings about a pressing and massaging by means of the smooth semi-circular member 31. In this way, the dehumidifying heat or cold air under pressure can be fully exploited at a very economical rate.

The air under pressure or another gas penetrates the tear-free residue cake, washes around all solid particles, and drives the humidity in the pores of the residue 23 forward in the direction toward the filter body K. During the further course, the absorption of humidity of the flowing warm or cold air under pressure has additionally a dehumidifying effect. The air under pressure flows into the channels 24 along the filter cylinder, passes through the radially arranged pipes 25 into the passage 26 in shaft 27, and finally flows off toward the outside through the control head S, P, D.

The mechanical pressing of the residue is effected by the smooth movable semi-circular resilient members 31. Also steam or other gases acting upon the residue 23 may be employed in the dehumidification chamber E. If such a gas treatment is to be employed, this treatment is carried out in the same manner as the processing operations in the chamber W for the washing-out operation or in the chamber E for the dehumidification. The separation toward other treating chambers is effected by the semi-circular resilient or cylindrical simultaneously rotating and resilient or biased elements 31 which have a smooth soft rubber-like and snugly sealing surface. The resilient sealing elements 31 can be controlled from the outside with regard to the magnitude of the resiliency.

In the dehumidification chamber E the first resilient member 31 of metal or synthetic material is pressed against the wet cake. The effect of the second resilient member is increased by the application of ultra sound. In this connection, the ultra sound oscillations additionally are effective in the dehumidifying air or gas stream which oscillations extend deep into the pores of the residue and bring about a strong and quick dehumidification while the residue 23 will be free from tears.

Discharge of the residue

The next working phase consists in the detaching of the residue 23 from the filter surface and in either the discharge of the residue 23 from the pressure chamber H into the atmosphere or into a receptacle which is likewise under the pressure of the pressure chamber H.

The air under pressure for the discharge of the residue flows under a higher pressure than the pressure in the pressure chamber H, controlled by the control head, through the pores of the horizontal line of cells 15. The residue is lifted by the air layer and while vibrating for a short period on said air layer, drops into the trough of the conveyor worm 36. This worm is designed as conveyor worm for stab resistant humid residue. The residue 23 is conveyed horizontally from one end wall to the other or from each end wall up to the center of the filter and is then carried by a discharge device out of the pressure filter. This discharge device works in conformity with the rotary piston principle and discharges the residue 23 by batches from the pressure chamber H.

In addition to being detached by the discharging push brought about by air under pressure in cell 15, the detaching of any type of residue is also effected by the elastic mechanical stripper 37. With residue cakes having strong adhesion properties, the air under pressure or the gas has small quantities of steam admixed thereto for purpose of increasing the effect. The small quantity of steam in form of mist aids the detachment of the residue cake at the pore zone due to a veil-like minor and not harmful condensation.

Regeneration of the filter pores

In the filtering technique, an uninterrupted complete regeneration of the filtering surface and the filter pores is of particular importance. Following each completed filtering charge consisting of filtration, washing of the residue, treatment of the residue, detachment of the residue and discharge, it is very important mechanically to carry out one working phase of the regeneration of the filtering surface and of the pores and to do this in a continuous manner while the filter cylinder rotates. Due to this continuous regeneration of the filter surfaces, an aging or encrusting of the solid particles along the rough pore walls and by surface effect cannot occur.

In conformity with this invention, a continuous regeneration is effected in the chamber R (see Fig. 1). This chamber R is separated at both sides from the rotating filtering cylinder surface Z, for instance by means of an adjustable block T which consists of a combination of a wire mesh with a synthetic material of low flexibility which is inert with regard to heat and chemicals. This block extends up to the filter cylinder surface so as just slightly to touch the same. At the top at the start of the cell 15, the block T is designed as residue stripping member 48. Simultaneously the residue transporting member, for instance the worm 36 moves in the semi-circular trough.

The stripper 37 in form of a rotating shaft is arranged in the chamber R for the regenerating operation. This shaft 37 is designed as a brush of appropriate metallic material or of an organic synthetic material. The rotating brush shaft 37 slightly touches the filter surface. A complete regeneration is effected, even when a shaft in said chamber R is equipped with blades and rotates at high speed. In this way the liquid undergoes a sharp frictional agitation without mechanically stripping the filter surface. As regenerating means, in many instances the pulp itself may be employed. In this instance the second partition G may be withdrawn from the filter cylinder Z in the direction of the pressure filter chamber F. The solid particles in the pulp have a frictional effect and wash the pore surface. If this is not possible for some reason, an appropriate liquid may be employed for regenerating purposes with a separate pump circuit and a chamber R confined on both sides.

If the residue is not valuable and is not to be processed further, solid rubbing particles such as quartz, corundum, silicon carbide or the like having a rubbing effect may be added to the circulating liquid in the confined chamber R.

In the regenerating chamber R there prevails the same pressure as in all other chambers of the pressure chamber H. Thus, a separation of the regenerating liquid toward both sides is not difficult. Each cell 1 to 18 rotating by the regenerating chamber R is by the control head S, P, D (see Fig. 2) and through the pores of the filter surfaces charged with pulsating air shocks under pressure. In this way, during each interval in which the air is under no pressure, regenerating liquid passes through the pores of the cell and is pressed back again into the chamber R by the succeeding compressed air shock from the rear, and this in intermixed condition, while still further air under pressure follows. The thus pressed-back liquid will, due to the acceleration imparted thereupon by the compressed air, produce a sand blast-like regenerating effect with regard to the solid particles which adhere to the pore openings. This alternating play of compressed air with liquid (filtrate of its own) assures a safe regeneration by means of which the pores are kept open.

A high pressure will not occur in the regenerating chamber R because either a pump arranged in a circuit with a fluid reservoir does not allow a high pressure or because the circulation is controlled by a separate float in a condenser-like manner and is maintained in pressure equilibrium, or because the total circulation of the regeneration communicates in a balancing manner with the pressure chamber H.

Due to the fact that it is one of the most important problems in the filtering technique to maintain the pores open, the operation can advantageously be improved, by means of a plurality of ultra sound generators U arranged in longitudinal direction of the pressure filter mantle 30. These ultra sound oscillations which act in a continuous or periodical manner will at an appropriate frequency loosen the solid particles. Thus, in combination with the agitation of the washing liquid, and in combination with the mechanical brushing off action and the pulsating flow of compressed air and liquid through the pores and additionally in combination with ultra sound, an uninterrupted safe regeneration of the filter surfaces and the filter pores will be obtained.

With some products, in the filtering technique, first a rough porosity of the filtering body or fabric is employed and thereupon, after a longer filtrate pulp circulation, a slight thickness of the accumulated residue is employed as clear filtering surface without a continuous regeneration of the pores and the filtering surfaces. By this method, particularly when hot filtration is employed, the encrustation between residue and pores is aided while the filtering output is reduced, and frequently no clear filtrate is obtained. By means of the pressure filter according to the persent invention, such special methods may likewise be employed inasmuch as the chamber R acts as filtration chamber and, consequently, the separating block G is withdrawn from the filter cylinder surface. In this instance, the brush shaft 37 may rotate in the pulp 22.

As has been mentioned above, in the regenerating chamber R, frequently the purification of the filtering surfaces and the pores may be effected by means of the pulp. There are certain products which have continuously impressed thereupon a slight layer of different type coarser solid particles so that during the instantly effected filtration a cloudy circulation of the filtrate will no longer occur. There are products to be filtered the residue of which is valueless which, however, due to their structure, are filtered under difficulties only. In such an instance, the regenerating chamber R acts as impression chamber for an appropriate special pulp which contains a filtering auxiliary means as for instance diatomaceous earth, carbon, and cellulose. This slight layer impressed upon the regenerated pores immediately yields a clear filtrate in the first cell 1 of the filtering pressure chamber F. In spite of these various properties caused by the structure of the solid particles, it is necessary that for a short time, the solid particles have to be strongly agitated on the filtering surface in order to prevent an encrustation and in order to maintain the filter output high. There is, however, one exception, namely mostly acetic salt solutions, electrolytes and the like and, in particular, a pulp which contains free hydrochloric acid. In contrast thereto, alkaline solutions, for instance those occurring in the aluminum industry, have very strong encrusting tendencies. The pressure filter according to the present invention makes it possible to filter free from germs. In this instance, the entire pressure filter is in a manner known per se filled, for instance with a pulp of diatomaceous earth, and this pulp is for a short time impressed upon the filtering surfaces. Another succeeding pulp will then filter free from germs through said residue cake having a thickness of from 20 to 30 millimeters. With a number of products having a crystalline or coarse amorphous structure, no ultra sound devices are needed in the filter pressure chamber F and in the washing chamber W because such pulp mostly has a quickly filtering and washing out property. Ultra sound devices are of essential advantage with each product in the dehumidification chamber E and in the regenerating chamber R.

Depending on the diameter of the filter cylinder Z, the processing steps and the treatment period for the residue may be increased and simultaneously, with each rotation of the cylinder Z, the treatment for each cell 1 to 18 may be effected for a different time and at different pressure in conformity with the structure of the solid particles of the filter residue. At two points, for instance at the cells 2 and 5, meters, e.g. thermoelectric gauges M, for measuring the thickness of the residue are arranged in the filtering pressure chamber F. These two meters for the residue thickness cooperate at the control head S in such a manner that the filtering speed and the increase in thickness of the residue on the filtering surfaces is controlled automatically so that by means of a relay-like control device, the rotative speed of the filter cylinder Z is effected. If this is not any longer permissible from an operation or production standpoint, the general filtering pressure (about 6 atmospheres above atmospheric pressure) is reduced in one or more cells by means of a counter pressure controlled automatically by the control head S so that the filtering speed in the chamber F decreases.

In view of the rotating filtering surface, the thermoelectric meter for the thickness of the residue must be equipped with a knife-like feeler head so that the residue is cut through and is not pushed aside. In view of the rotation of the filtering cylinder Z with the filter residue 23, the feeler of the meter M of the thickness of the residue is designed in form of a shoe and is provided with a protrusion 50 which is flat like a knife blade so that the slowly sliding residue 23 is closely held together at the feeling point in form of a wide layer whereby the change in temperature is adapted immediately and in a sensitive manner to react through a relay upon the rotative speed of the filtering cylinder.

*Filter body*

The pressure filter works advantageously in every respect with filter bodies made of ceramics or synthetic material with a porosity conforming to the respective product. It is possible for particular purposes to select the porosity of the ceramic or synthetic material coarser so that such filter bodies serve as supporting bodies only. The entire cylinder Z is then covered with an appropriate porous wire mesh so that the residue will collect on the pores of the wire mesh. With regard to the cell effect in the chambers A and R, the wire mesh must have wound thereupon a spiral wire in order to be able to withstand all loads from the inside toward the outside. The filter bodies K of ceramic material can, even under continuous influence of the regenerating energy, be employed over a long period of time, and, as experience has proved, over a period of from two to four years. A particularly long period of operation can be obtained for such filters if porous metal in a chemically indifferent alloy or metal in disc form with rough surface is employed. Filter bodies of organic synthetic material will have a very long period of life when the temperature of the pulp and the temperature in the various treatment stages is not too high, i.e. does not exceed 100° Celsius.

Each filter body of synthetic material must have a sufficiently thick wall in order to be able to withstand the periodic pulling stress in chambers A and R. This thickness does not impede the passage of the filtrate however, during the regeneration of the pores by the strong flowing mixture of liquid and air under pressure or gas under pressure, a braking of the mixture acting in a sand blast-like manner must take place only to a minor degree. From a filtering standpoint, the following considerations are to be kept in mind: fine narrow pores are required for the filtration and, therefore, the filter bodies are mechanically strong. However, for the regeneration, the pores must be such that the regenerating energy will be braked to a minor extent only. The regenerating energy amounts to from 3 to 6 atmospheres above atmospheric pressure. An aging of the residue on the pores or an encrustation will take place to the same extent at any size of the pores. Due to this tendency of encrustation, it is necessary to feed the regenerating energy possibly without being braked and in admixture with liquid and air under pressure effectively to the zone of encrustation. Only by the regeneration of the porous synthetic materials in conformity with the present invention it has been made possible to employ rigid synthetic filter bodies in industry at large.

For the pressure filter according to the invention, it is necessary to produce the filter body in conformity with the respective pressure requirements. To this end, advantageously the passages 24 for the filtrate and for all operating means are provided in the interior and, more specifically parallel to the surface of a thick segmental plate K (see Fig. 3). These individual plates which have a length for instance of 333 millimeters are covered at five sides with an acid and alkali resistant viscous solution, for instance with rubber or synthetic material or with water glass, enamel or metal under pressure and temperature so as to be completely pore tight. This solution may, if desired, be sprayed upon said plates. With ceramic material, the said passages may be obtained by inserting melting or sublimating cores into the die for each plate and pressing and subsequently firing the plate.

The completed filter bodies are by means of acid and alkali resistant putty tightly embedded into the trough-like depressions on the filter cylinder Z. On the two longitudinal sides of the filter body, the pore seal 49 does not extend up to the surface of the body so that no filtering pores will be braked laterally. For purposes of stabilizing the filtering surface, the circumference of the cylinder Z is provided with metal walls or ribs 30 extending around the cylinder.

The filter bodies K of synthetic or ceramic material are evenly subjected to tearing stress by the discharge pressure in chamber A and the purification pressure from the inside toward the outside in chamber R because the pore-free hard indifferent layer 49 prevents the pressure means from acting from the inside toward the outside of the metal cylinder wall Z and thus prevents the entire ceramic surface of the cell the pores of which are provided on the filtering side, from being subjected to stress and simultaneously from being pressed toward the outside out of the trough-like bearing. It would be uneconomical to hold the porous cells K by means of screws, metal bands or the like against the high pressure from the inside. Moreover, this would considerably increase the cost of the filter system, would reduce all effective working surfaces and would increase corrosion. A connection of a type according to which the body K would be provided at its sides with a dove-tail arrangement by means of which it would be slipped into correspondingly shaped longitudinal ribs on the cylinder Z, would reduce corrosion but it would not prevent the strong bending pressure. Moreover it would make more difficult the exchange of an individual cell K.

The filter surface may advantageously be applied, for instance by spraying, as a very thin layer 51 (Fig. 3) for instance with a thickness of 0.5 millimeter in form of an amorphous or crystalline filter body mass. The spraying may be effected under pressure and temperature. The advantage consists in that the entire filter body will be provided with pores which will be larger by one or two sizes and thus can be well regenerated and will have a small pore size for building up the residue in a very thin layer only. Due to the very short and narrow pores, this layer will brake or impede the regenerating energy to a minor extent only. In connection with some products it is desired to wash out the same in conformity with the known enriching system. Also this can be effected in an uninterrupted manner with the pressure filter according to the invention. In this instance a second washing chamber W is provided on the circumference of the cylinder Z. When a pulp is to be filtered which contains only relatively few solid particles or if the small residue is valueless so that it will not or only to a minor extent be washed out, the washing chamber W up to and including the cell 11 may be employed as pressure filter chamber F and may be controlled by the head D. The dehumidification chamber E is in this instance sub-divided at cell 12 as a short washing-out chamber. The pressure filter is thus adaptable to any composition of the pulp.

When a pulp is to be filtered which contains traces only of solid particles as is the case for instance in the aluminum industry, the pressure filter according to the invention can still be employed economically. In this instance the formation of the residue is immaterial. A small residue will form on the filter after a long period of time only. Frequently the residue is valueless. In all such instances, the pressure filter is adaptable to the particular conditions of operation involved and works very economically. In such an instance the filter cylinder Z stands still and the entire filter cylinder surface with the chambers F, W, E, A and R are employed for periodically filtering, for instance for a period of from six to twelve hours. Thereupon in a quick working cycle all treatments of the residue and especially the regeneration of the pores in chamber R may be effected.

The adaptability of the pressure filter according to the invention is such that with the above mentioned filtration, the period of rotation of the cylinder can be adjusted so that the filter rotates one time only in for instance twelve hours. The regeneration of the pores in the chamber R will be carried out in an uninterrupted manner with a pulp containing solid particles to a minor extent only. The liquid thick mud which forms over a longer period in chamber A may be discharged periodically or in an uninterrupted manner if strong throttling is encountered. Thus, the pressure filter according to the present invention is adapted to act simultaneously as filter and as pressure thickener.

Chemical regeneration

With all heretofore known filters which have no continuous regeneration of the pores but have only a mechanical regeneration of the pores, three times a day, it is necessary after a period of from six to ten days chemically to regenerate the entire pressure filter. This is effected by dissolving all encrustated solid particles in a chemically effective liquid such as hydrochloric acid or soda liquor. With the above described method of uninterrupted regeneration in conformity with the present invention, the periodic chemical regeneration may in most instances be completely omitted because also over a longer period of operation no encrustation of the pores will take place. If, however, a chemical regeneration becomes necessary, all filters and treatment elements are turned off and the chamber R only automatically regenerates all filter surfaces and filter pores in a period of ten minutes in the circuit of the acid or liquor. Following such regeneration, an automatic washing with water is effected in a similar manner in order completely to remove the chemically effective regenerating means. After these automatic operations, the pressure filter is practically new again so that it is ready for further operation after a very short time of regeneration.

Drive and control of the pressure filter

The filter cylinder Z has both end surfaces provided with a shaft 27 (Fig. 2) which extends at one end surface or at both end surfaces toward the outside. One end of the shaft 27 is preferably provided with a three-part control head S, P and D in conformity with Fig. 2. The shaft 27 has mounted thereon a worm wheel 39 which is driven by one or more shiftable worms at an appropriate stepdown ratio. The pressure filter requires that its period of rotation be adjustable as desired, for instance one revolution per every twelve minutes for one type of pulp and one revolution per every twelve hours for another type of pulp. These conditions are most economically met either by a rotary piston motor with resiliently sealing pressure plates or by two pressure cylinders with piston and pawl-ratchet system (not shown) which work in offset phases. The motor 40 or cylinder are fed with air under pressure, steam, water, oil or the like.

The control head consists of three main members namely a member S which forms the end of shaft 27 and is directly connected to the pressure filter, and a member P which moves quickly in periodic succession. The member P rotates during one period with the cylinder Z while one passage is pressed against the passages for one cell width thereby taking care of the feeding or discharging of all working means. The member P is then by means of a contact of the worm wheel 39 released, quickly returns to its starting point where it stops and then in the same manner provides the next cell with working means and moves along with the latter over the width of a cell (pilgrim step). This play is continuously repeated. The speed of this periodic movement is dependent on the rotation of the filter cylinder Z which rotation can be controlled automatically through relays and meters M measuring the thickness of the residue. The control head also comprises a third member D which does not move and serves for connection with all conduits for the working means. Furthermore, all registering control and signalling devices are connected to the said member D.

The connection of the head D with the head P is maintained over the width of a cell by armed pressure hoses 42 which have sufficient play of movement. This arrangement increases the safety of operation and makes it possible to carry out a great number of processing operations in the pressure filter. In this connection only short control strokes are necessary in the control head while the control periods are short for the width of each cell.

The sealing of the passages 26 with the periodically advancing and returning head S is effected by means of pneumatically or hydraulically actuated sleeves or hoses extending about each passage 26. Each sealing member or sleeve has each sliding surface provided with a sliding layer of for instance graphite-synthetic material 47. For purposes of aiding the sliding surfaces, the head member S has embedded therein strong rings 41 of hard graphite-synthetic material or the like. Additionally, this entire zone may be lubricated by graphite-grease pressure lubrication.

With all pulps which contain for instance benzol, toluol, xylol or other hydrocarbons, which swell or dissolve rubber or the other employed synthetic materials or do so during operation at elevated temperatures, a safe sealing may be effected in the following manner. A correspondingly deep channel 52 (see Fig. 4) has provided therein a number of intercommunicating resilient pipes 53 (aneroids) which are closed on all sides. These pipes are periodically fed with a pressure means. The ring 54, which may for instance be wedge-shaped, presses upon the flexible molded body which fits snugly against the walls and consists of graphite-asbestos-silicon-lead threads 54 and presses the entire unit at a desired pressure against the hard and smooth sliding ring 47 of hydrocarbon-synthetic material. In this way, a safe sealing is obtained for all pressure containers and other devices the pressure surfaces of which stand still or do not rotate at a high speed.

The channels 26 for the operating means of each working cell 1 to 13 lead into the head D through pressure hoses 42. Here the automatically indicating control members may be connected to each channel. Thus, a photoelectric cell may be provided for the filtrate at the cells 1 to 3, while in cell 11 an automatically operating density meter may be provided for the wash filtrate. In most instances, the contents as to solid particles in the pulp is known by analysis. In such instances, a liquid meter indicates the output of the filter as to the filtrate and thus also indicates the quantity of solid particles. Additionally, the residue may be registered at the discharging members. Furthermore, the employed quantity of circulating liquid for the washing-out operation may be registered by a liquid meter on a comparative basis.

The time of the control and the rotative speed of the cylinder Z will be registered on the control table for all operations by means of a pointer 43 (Fig. 2) which, if desired, may have connected thereto a writing mechanism. Similarly, the number of revolutions of the cylinder Z per day is effected by a counting mechanism 44. Thus, partly on a comparative basis, the daily total output and also the quality can be registered automatically. The above mentioned measuring devices are connected with signalling means so that a corresponding sound or light signal or both will be given if one operating phase does not work properly.

All operating steps such as the filtration, the washing out of the residue, or the dehumidification for each product are different from each other. Also each working phase for each product differs as to treatment time depending on the further processing or the chemical composition. The method which will be described further below makes it possible that the entire operation and each individual phase can be adapted to the properties of each respective product. All above mentioned conditions can be met when the outlets of each cell 1 to 18 lead to chambers under different pressure.

If for instance the general operating atmosphere has a pressure of 6 atmospheres above atmospheric pressure, there will prevail in the cell 1 a counter pressure of 5 atmospheres above atmospheric pressure which means that upon the new purified width of the cell, the residue can carefully build up on the pores. The cell width 2 will obtain a counter pressure of 4 atmospheres above atmospheric pressure, the cell 3 will have a counter pressure of 3 atmospheres above atmospheric pressure, and from cell 4 on, the counter pressure will be zero above atmospheric pressure. These operations in chamber F may also be adjusted at the control head D in any other desired manner. Expediently, the arrangement as described above is selected which is diagrammatically illustrated in Figs. 5 and 6. Manometers 60 will allow the reading of the respective pressures.

Each product regardless of whether it is alkaline or acid has a different degree of washing out and requires a different time for the washing-out operation. Thus, the cells 8 to 11 may be connected to the control head D for different pressures, and with each product and even low pressure may be selected for all cells which pressure will automatically be registered by the density meter at the cell 11 on the head D. In the chamber E the operations for the dehumidification are similarly effected. The operations in the cells 15 to 18 take place in a similar manner and an appropriate manner. All these different operations which also differ as to the time of carrying out the same make it possible to vary the speed of rotation of the filter cylinder in conformity with the respective product and to adapt the entire pressure filter to various products while simultaneously assuring high efficiency and great economy.

With solid particles having a coarse structure, the pressure filter can also be operated at considerably lower output as cylinder vacuum filter.

Figure 7:
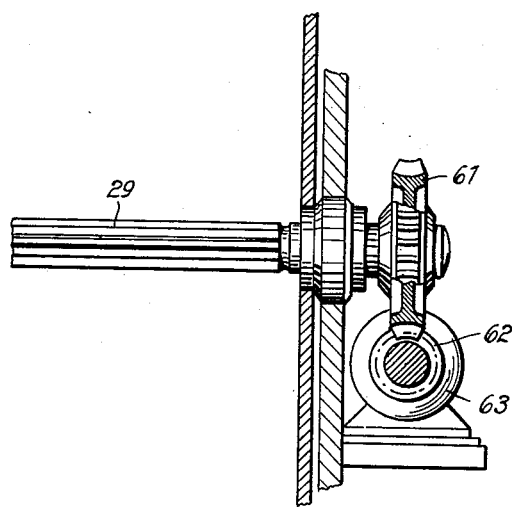
Fig. 7 shows the drive for the residue miller.

Fig. 7 illustrates the drive for the miller 29. The miller shaft 29 extends toward the outside from the outer cylinder mantle and has connected thereto a worm wheel 61 which is driven by a motor 63 through a worm 62.

Figure 8:
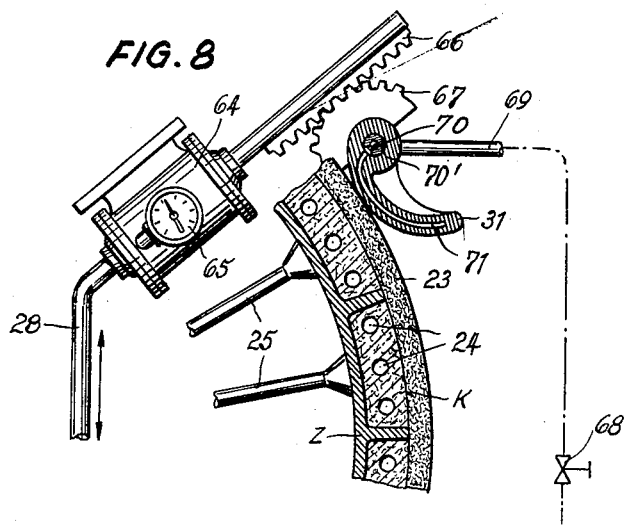
Fig. 8 illustrates a pressure member adjustable through the intervention of a manometer.

Fig. 8 illustrates an embodiment for controlling the pressure upon the biased or sealing members 31 said pressure is effected pneumatically through the conduit 28 for air under pressure which by means of pneumatic cylinder 64 acts upon the rack 66 provided with a piston inside the cylinder 64. The rack 66 meshes with a tooth segment 67 fixedly connected with the biased member 31. The pneumatic cylinder 64 has connected thereto a gauge 65 for indicating the pressure.

In order to be able to vary the temperature of members 31, the latter may respectively be provided with passages 71 communicating with a bore 70 in shaft 70'. Bore 70 in its turn communicates with a conduit 69 comprising a shutoff or control valve 68 and adapted to be connected to a steam supply source (not shown in the drawings).

If it is desired that all members in the interior of the machine are clearly observable and easily accessible, the lid 49 may be eliminated while the connections for all conduits on the lid will be effected in another appropriate manner. A cylinder mantle adapted in a manner known per se to be closed by pressure means or mechanical means may be moved over the entire interior of the pressure filter similar to the well-known pressure filter of the Kelly system. The quickly detachable movable cylinder mantle then forms the pressure cylinder which surrounds the pressure chamber H in which the general pressure atmosphere prevails.

The pressure filter according to the invention has the advantage that the diameter of the filter cylinder Z may normally amount up to 3 meters. This diameter with a sub-division of the circumference into for instance 24 parts or more assures a precise operation of numerous treatment phases.

Pressure filters with larger diameter may in special instances be designed so that all operations which occur on the outer cylinder surface will also occur on the inner cylinder surface so that practically the same operations and treatments are duplicated namely once on the inside and once on the outside.

It is, of course, to be understood that the present invention is, by no means, limited to the particular construction shown in the drawings but also comprises any modifications within the scope of the appended claims.

What I claim is:

1. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; a plurality of biased pressing members interposed between said treatment stations and continuously urged against said filter cylinder; scraping means arranged within said pressure chamber near the end of said filtration station and spaced from the adjacent circumferential surface portion of said filter cylinder by a distance corresponding to the respectively admissible thickness of residue accumulation on said filter cylinder; and an ultra-sound generator arranged at least partially in said pressure chamber adjacent said regenerating station.

2. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station, said filtration station comprising a filtration chamber within said pressure chamber and confined on one side by said filter cylinder while its contour follows the contour of said filter cylinder, one side of said filtration chamber being provided with an inlet for the fluid to be filtered and the other side of said filtration chamber being provided with an overflow outlet; a plurality of biased pressing members interposed between said treatment stations and continuously urged against said filter cylinder; scraping means arranged within said pressure chamber near the end of said filtration station and spaced from the adjacent circumferential surface portion of said filter cylinder by a distance corresponding to the respectively admissible thickness of residue accumulation on said filter cylinder; and an ultra sound generator arranged at least partially in said pressure chamber adjacent said regenerating station.

3. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; a plurality of biased pressing members interposed between said treatment stations and continuously urged against said filter cylinder; rotatable scraping means having its axis of rotation parallel to the axis of rotation of said filter cylinder and arranged within said pressure chamber directly following said filtration station for scraping off from the residue accumulating on said filter cylinder the residue in excess of the respectively admissible thickness of residue accumulation on said filter cylinder; and an ultra sound generator arranged at least partially in said pressure chamber adjacent said regenerating station.

4. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; said washing-out station including a washing-out chamber confined by the outer cylinder and the filter cylinder and having an inlet and outlet for the residue and also being provided with an inlet for the washing-out liquid; screen-like baffle plate means arranged within said washing-out chamber at the point where the washing liquid hits upon the residue deposited on said filter cylinder; biased adjustable pressing members respectively arranged at said inlet and outlet and provided with a smooth curved surface pressing in a sealing manner radially against the residue deposited upon said filter cylinder so that the residue will enter the washing-out chamber at a slight pressure and leave the same at a slight pressure; scraping means arranged within said pressure chamber near the end of said filtration station and spaced from the adjacent circumferential surface portion of said filter cylinder by a distance corresponding to the respectively admissible thickness of residue accumulation on said filter cylinder; and an ultra sound generator arranged at least partially in said pressure chamber adjacent said regenerating station.

5. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; pressing elements associated with said dehumidifying station and having a biased curved contacting portion radially pressing against the residue on that respective portion of said filter cylinder which pertains to said dehumidifying station, said elements being provided with means for varying the temperature thereof; scraping means arranged within said pressure chamber near the end of said filtration station and spaced from the adjacent circumferential surface portion of said filter cylinder by a distance corresponding to the respectively admissible thickness of residue accumulation on said filter cylinder; and an ultra sound generator arranged at least partially in said pressure chamber adjacent said regenerating station.

6. A filter according to claim 5, which includes additionally a low frequency sound generator at least partially extending into said washing-out chamber.

7. A filter according to claim 5, in which the dehumidifying station has associated therewith a device for producing infra-red heat rays.

8. A filter according to claim 1, which includes a residue discharge chamber; driving means for said filter cylinder for rotation of said filter cylinder at a very low speed; and means for making all treatment stations with exception of said filtration station and said regenerating station ineffective to thereby allow use of nearly the entire circumference of said filter cylinder for filtering purposes and to allow use of said residue discharge chamber for thickening the pulp when filtering a pulp with a small quantity only of solid particles.

9. A filter according to claim 1, in which the peripheral surface of said filter cylinder is covered with a layer of diatomaceous earth, activated carbon, or aluminum silicate.

10. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; a plurality of biased pressing members interposed between said treatment stations and continuously urged against said filter cylinder; and scraping means arranged within said pressure chamber near the end of said filtration station and spaced from the adjacent circumferential surface portion of said filter cylinder by a distance corresponding to the respectively admissible thickness of residue accumulation on said filter cylinder.

11. A pressure filter according to claim 10, which includes a plurality of meters respectively associated with said treatment stations for indicating the respective treatment therein, and control means respectively operatively connected with said meters for controlling the respective treatment in said stations in conformity with the respective treatment measured by said meters.

12. A filter according to claim 10, in which the ultra sound generator extends into said regenerating chamber.

13. A filter according to claim 10, which includes a ratchet-pawl transmission member drivingly connected to said inner part; a driving worm drivingly connected to said inner part; means controlled by said driving worm for temporarily making said ratchet-pawl transmission member ineffective; and fluid motor means drivingly connected to said worm.

14. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; a plurality of biased pressing members interposed between said treatment stations and continuously urged against said filter cylinder; rotatable scraping means having its axis of rotation parallel to the axis of rotation of said filter cylinder and arranged within said pressure chamber directly following said filtration station for scraping off from the residue accumulating on said filter cylinder the residue in excess of the respectively admissible thickness of residue accumulation on said filter cylinder; an ultra sound generator arranged at least partially in said pressure chamber adjacent said regenerating station, an ultra sound generator arranged at least partially within said pressure chamber and adjacent said filtering station for acting upon fluid to be filtered therein; a residue meter arranged within said filtration chamber for measuring the thickness of the residue deposited on said filter cylinder within said filtration chamber, said residue meter including filter means substantially flat at its contact point with the rotating residue on said filter cylinder and provided with a knife-like edge; control means operatively connected to said residue meter for controlling the speed of rotation of said filter cylinder; and control means controlled by said residue meter for controlling the pressure in said pressure chamber.

15. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; said washing-out station including a washing-out chamber confined by the outer cylinder and the filter cylinder and having an inlet and outlet for the residue; biased adjustable pressing members respectively arranged at said inlet and outlet and provided with a smooth curved surface pressing in a sealing manner radially against the residue deposited upon said filter cylinder so that the residue will enter the washing-out chamber at a slight pressure and leave the same at a slight pressure, the end faces of said pressing members being provided with a sealing elastic slidable element narrowing the washing-out chamber; the entire outer surface of the deposit throughout said washing-out chamber being covered with a thin layer of washing-out liquid; means for maintaining the thin liquid layer of washing-out liquid constant at the level of the washing-out liquid; scraping means arranged within said pressure chamber near the end of said filtration station and spaced from the adjacent circumferential surface portion of said filter cylinder by a distance corresponding to the respectively admissible thickness of residue accumulation on said filter cylinder; and an ultra sound generator arranged at least partially in said pressure chamber adjacent said regenerating station.

16. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; said washing-out station including a washing-out chamber confined by the outer cylinder and the filter cylinder and having an inlet and outlet for the residue and also being provided with an inlet for the washing-out liquid; screen-like baffle plate means arranged within said washing-out chamber at the point where the washing liquid hits upon the residue deposited on said filter cylinder; biased adjustable pressing members respectively arranged at said inlet and outlet and provided with a smooth curved surface pressing in a sealing manner radially against the residue deposited upon said filter cylinder so that the residue will enter the washing-out chamber at a slight pressure and leave the same at a slight pressure; scraping means arranged within said pressure chamber near the end of said filtration station and spaced from the adjacent circumferential surface portion of said filter cylinder by a distance corresponding to the respectively admissible thickness of residue accumulation on said filter cylinder; and an ultra sound generator at least partially extending into said washing-out chamber.

17. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder comprising porous segmental filter sections arranged around the entire circumference of said filter cylinder for receiving the residue deposited thereon; said segmental filter sections being grouped together for circumferentially successively forming treatment stations including a filtration station, a washing-out station, a dehumidifying station, and a regenerating station; a residue detaching chamber arranged adjacent and subsequent to said dehumidifying station for detaching the residue on said segmental filter sections; a separating wall forming a trough and arranged below said residue detaching chamber; conveying means arranged in said trough for withdrawing the detached residue; said filter sections having conduit means therethrough extending substantially parallel to the axis of rotation of said filter cylinder; resilient stripper means arranged between said conveying means and said filter cylinder; means associated with said conduit means for feeding compressed gases into said conduit means and through the porous wall of said filter sections against the adjacent surface of the residue deposited on said filter sections to force the same off said filter sections; means for controlling the degree of humidity of the compressed gas in said conduit means; control means controlling the pressure of the gases fed through said conduit means so that the pressure of said last mentioned gases will be higher than the pressure in said pressure chamber; a plurality of biased pressing members interposed between said treatment stations and continuously urged against said filter cylinder; scraping means arranged within said pressure chamber near the end of said filtration station and spaced from the adjacent circumferential surface portion of said filter cylinder by a distance corresponding to the respectively admissible thickness of residue accumulation on said filter cylinder; and an ultra sound generator arranged at least partially in said pressure chamber adjacent said regenerating station.

18. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder comprising porous segmental filter sections arranged around the entire circumference of said filter cylinder for receiving the residue deposited thereon; said filter sections being grouped together to form circumferentially successively arranged treatment stations including a filtration station, a washing-out station, a dehumidifying station, and a regenerating station for regenerating the pores and the surfaces of said filter sections; said regenerating station including a regenerating chamber having its lateral walls in sliding contact with said filter cylinder and being adapted to receive a circulating regenerating liquid; a plurality of biased pressing members interposed between said treatment stations and continuously urged against said filter cylinder; scraping means arranged within said pressure chamber near the end of said filtration station and spaced from the adjacent circumferential surface portion of said filter cylinder by a distance corresponding to the respectively admissible thickness of residue accumulation on said filter cylinder; means for removing the residue remainders from the surface of the filter cylinder, said means being located as close as possible to said surface; and an ultra sound generator arranged at least partially in said pressure chamber adjacent said regenerating station.

19. A filter according to claim 10, which includes means operable alternately to effect an impulse in said regenerating chamber and subsequently in reverse direction and in cooperation with the same filter liquid to produce an over-pressure of the filtrate to produce a sand blast-like effect.

20. A filter according to claim 18, in which the regenerating liquid contains abrasive particles.

21. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially serially arranged treatment stations including a filtration station, a washing out station, a dehumidifying station, and a regenerating station; a separating block interposed between said filtration station and said regenerating station and forming a partition therebetween adapted to be slightly radially withdrawn from said filter cylinder to thereby allow a portion of the pulp to be filtered at said filtration station to be conveyed therefrom to said regenerating station for use as regenerating fluid; a plurality of biased pressing members interposed between said treatment stations and continuously urged against said filter cylinder; and scraping means arranged within said pressure chamber in spaced relationship to the adjacent circumferential surface portion of said filter cylinder in conformity with the respectively admissible thickness of residue accumulation on said filter cylinder.

22. An immersion-pressure filter according to claim 21, in which the filter cylinder is covered with a dense substance.

23. A filter according to claim 10, in which the filter cylinder consists of a material having larger pores than necessary for the filtration, and which includes a metallic filter fabric strip with narrow pores spirally wound around said filter cylinder.

24. A filter according to claim 10, in which the filter cylinder consists of a material having larger pores than necessary for the filtration, and in which the surface of the filter cylinder is covered by a thin layer of a filtering substance with narrow pores.

25. A filter according to claim 10, which includes a plurality of segmental filter members arranged over the entire circumferential surface of said filter cylinder and provided with axial channel means for receiving the filtrate, the various surfaces provided with said axial channel means and the movable control walls being arranged adjacent each other, and sealing means cooperating with pressure fluid means for effecting the sealing of said surfaces.

26. A filter according to claim 10, in which the end faces of the filter cylinder are provided with pressure responsive sealing means.

27. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder being provided with circumferentially successively arranged treatment stations including a filtration station, a washing-out station, a dehumidifying station, and a regenerating station; a plurality of biased pressing members interposed between said treatment stations and continuously urged against said filter cylinder; scraping means arranged within said pressure chamber near the end of said filtration station and spaced from the adjacent circumferential surface portion of said filter cylinder by a distance corresponding to the respectively admissible thickness of residue accumulation on said filter cylinder, connecting conduits leading to said stations, said stations comprising a plurality of filter cells, and control means for stepwise changing the connection of said conduits with said cells while said cylinder is rotating, said control means being operable to effect said changing connection at each rotative advance of said cylinder by the width of a filter cell.

28. In a continuously operable immersion-pressure filter: an outer cylinder; a filter cylinder rotatably mounted within said outer cylinder and confining with the latter a pressure chamber arranged on the outer circumference of said filter cylinder and adapted to be supplied with a compressed gas; said filter cylinder comprising porous segmental filter sections arranged around the entire circumference of said filter cylinder for receiving the residue deposited thereon; said segmental filter sections being grouped together for circumferentially successively forming treatment stations including a filtration station, a washing-out station, a dehumidifying station, and a regenerating station; said filter sections having conduit means therethrough extending substantially parallel to the axis of rotation of said filter cylinder; a plurality of biased pressing members interposed between said treatment stations and continuously urged against said filter cylinder; scraping means arranged within said pressure chamber near the end of said filtration station and spaced from the adjacent circumferential surface portion of said filter cylinder by a distance corresponding to the respectively admissible thickness of residue accumulation on said filter cylinder; an ultra sound generator arranged at least partially in said pressure chamber adjacent said regenerating station; a shaft extending through at least one end face of said outer cylinder and rotatably connected to said filter cylinder, said shaft having a plurality of bores therein extending parallel to and along a circle concentrically arranged with the longitudinal axis of said shaft; radial conduit means effecting communication between the conduit means in said filter sections and said bores of said shaft; a control head comprising an inner part having one of its end faces in sealing engagement with the adjacent end face of said shaft and being movable relative thereto by a certain angle, said inner part being provided with passages extending along a circle in coaxial arrangement with the axis of said inner part for communication with said radial conduit means, said control head also including a stationary part with a plurality of bores therein for communication with said passages; flexible connecting means interconnecting said passages and said bores; the stationary part of said control head having associated therewith a variable fluid pressure chamber adapted through the bores and passages in said control head to be connected with the conduit means in said filter sections, and control means respectively associated with said filter sections for individually controlling the working conditions of the treatment stations.

29. A filter according to claim 28, which includes indicating means associated with the stationary part of said control head for indicating the operative conditions at each treatment station and the admission of actuating fluid to and discharge thereof from the respective treatment stations.

References Cited in the file of this patent

UNITED STATES PATENTS

| Re. 19,137 | Wright et al. | Apr. 17, 1934 |
| 1,979,991 | Newton et al. | Nov. 6, 1934 |
| 2,197,610 | Fedeler | Apr. 16, 1940 |
| 2,265,386 | McBerty et al. | Dec. 9, 1941 |
| 2,576,288 | Fink et al. | Nov. 27, 1951 |
| 2,720,315 | Peterson | Oct. 11, 1955 |
| 2,741,369 | Fest | Apr. 10, 1956 |
| 2,790,762 | Heyman | Apr. 30, 1957 |

FOREIGN PATENTS

| 498,170 | Italy | Sept. 29, 1954 |